April 15, 1969     R. A. DURNO ETAL     3,438,596
TOW BOOM INSTALLATION
Filed May 15, 1967                               Sheet 1 of 3
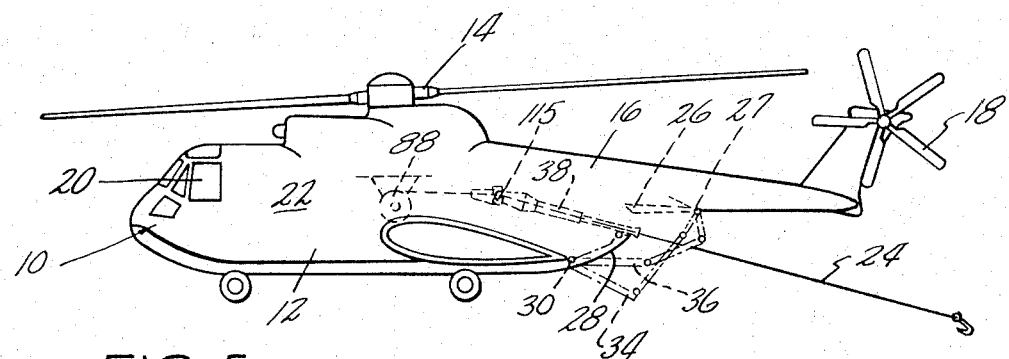
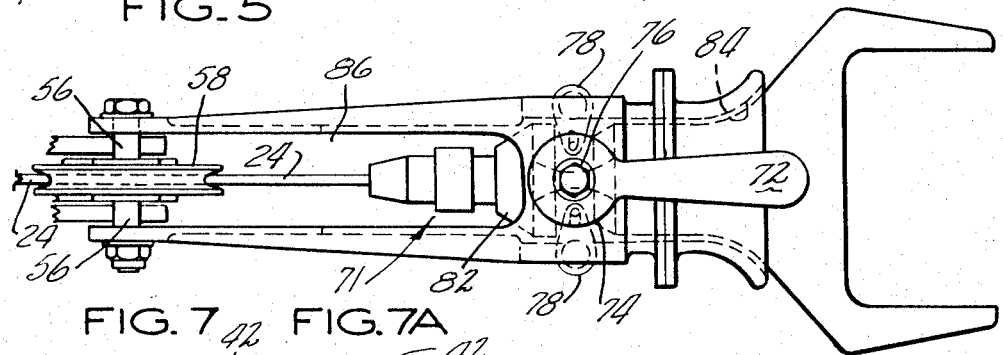
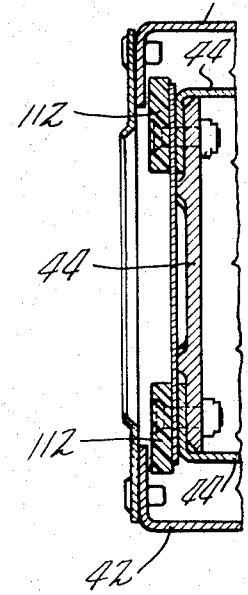
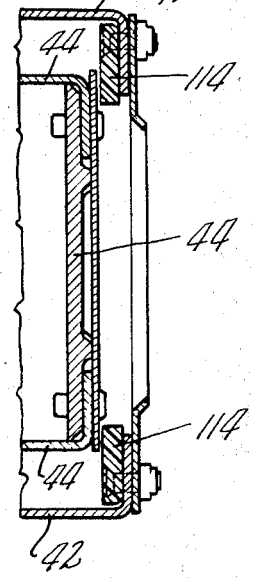
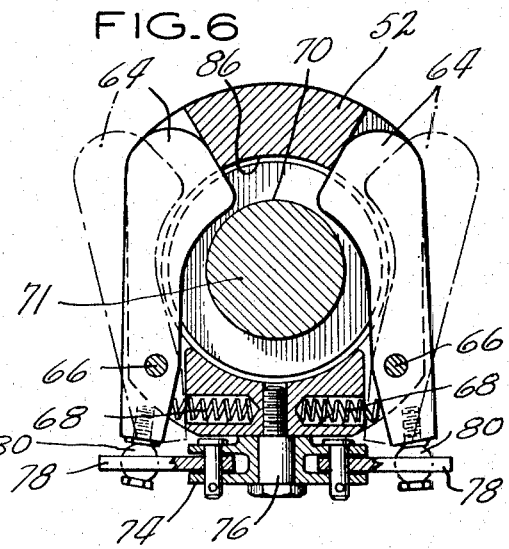
INVENTORS
RONALD A. DURNO
WILLIAM HULY
BY M. B. Tasker
ATTORNEY

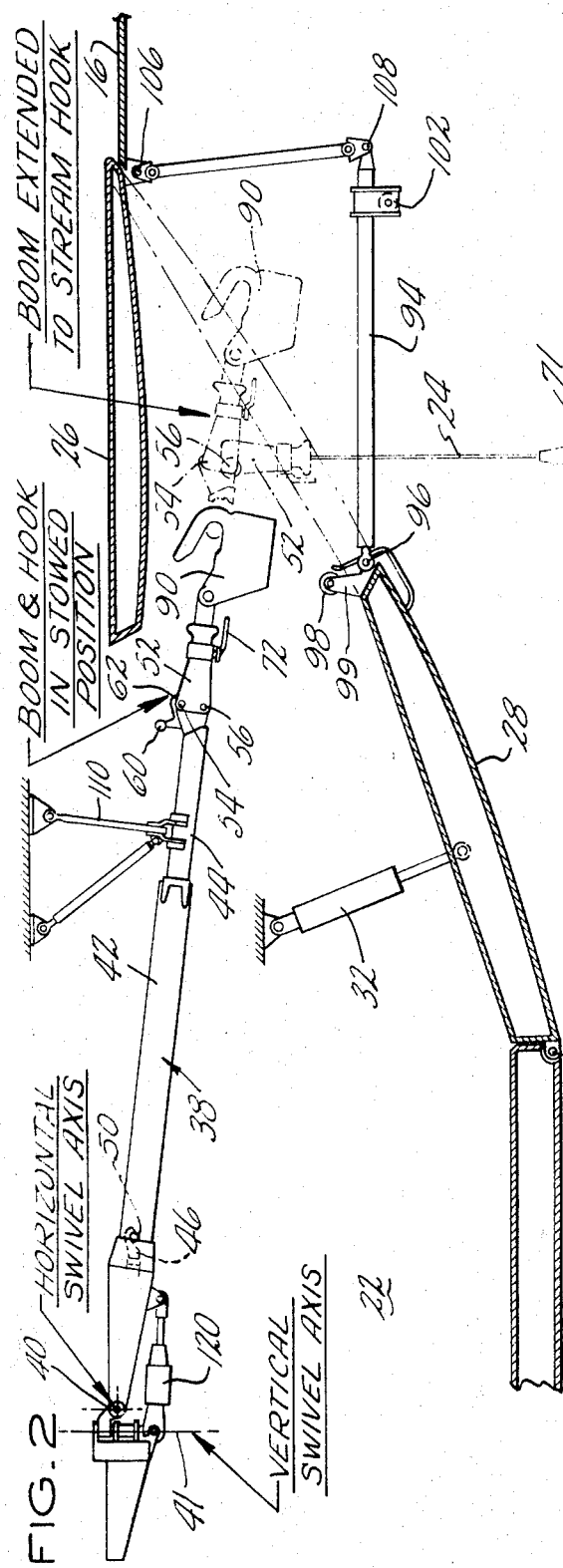

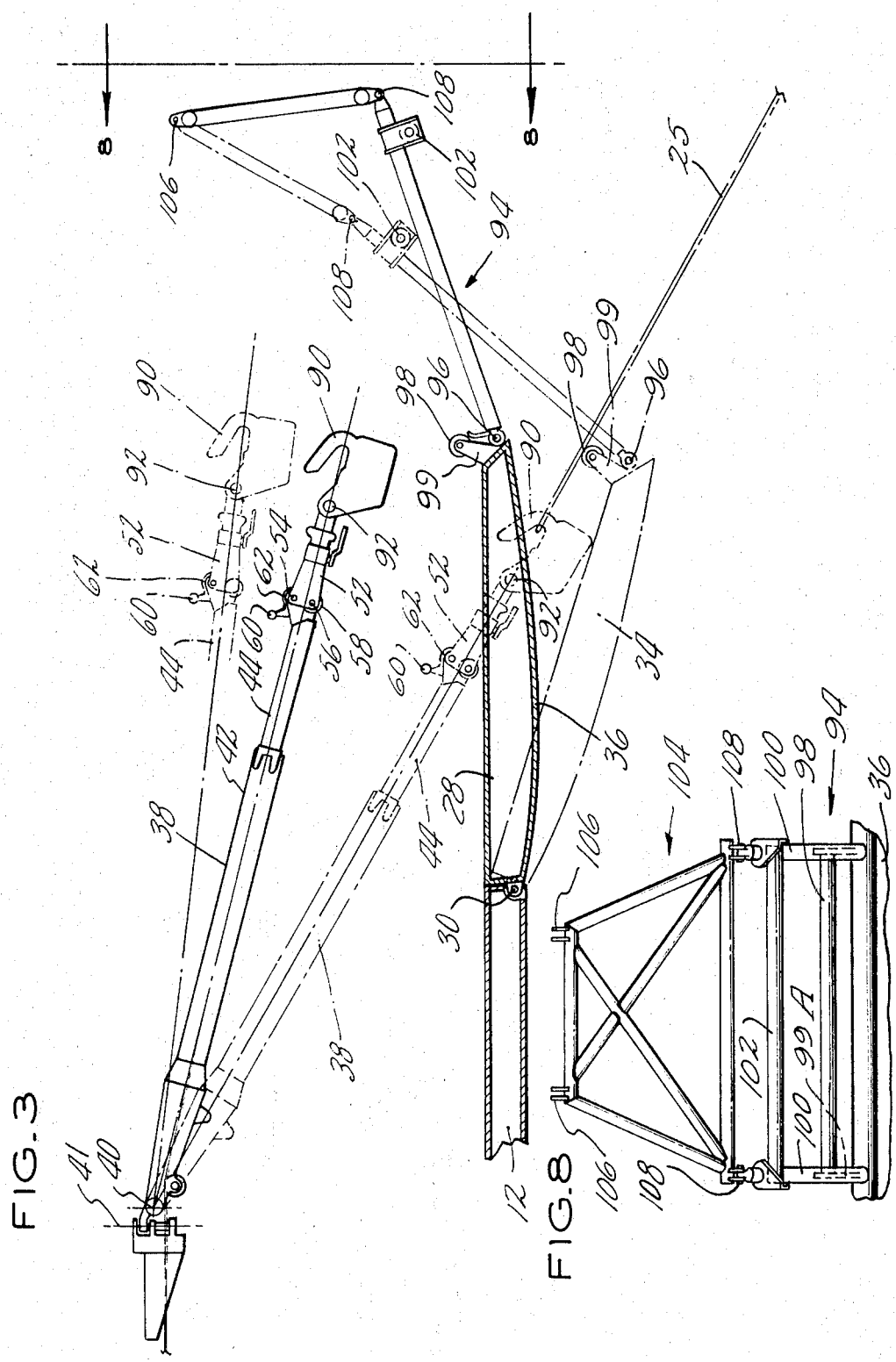

United States Patent Office 3,438,596
Patented Apr. 15, 1969

3,438,596
TOW BOOM INSTALLATION
Ronald A. Durno, Trumbull, and William Huly, Stratford, Conn., assignors to United Aircraft Corporation, East Hartford, Conn., a corporation of Delaware
Filed May 15, 1967, Ser. No. 638,305
Int. Cl. B64d 3/00; B60d 1/14
U.S. Cl. 244—3                                7 Claims

ABSTRACT OF THE DISCLOSURE

A tow boom carried by an aircraft has a releasable tow hook latching mechanism at its trailing end. A tow cable routed through the boom has its inboard end attached to a winch and its outboard end attached to a two hook assembly that can be raised and lowered and is automatically engaged by the latching mechanism on the end of the tow boom when the cable is fully winched in.

The invention described herein was made in the course of or under a contract or subcontract thereunder with the Department of the Navy.

*Background of invention*

This invention relates to improved automatic means for safely deploying and retrieving a tow hook and particularly to means which completely eliminates handling of the hook. When it is desired to retrieve an object which is floating in the water or to engage an object to be towed by a helicopter, a telescoping tow boom carried by the helicopter is extended into position to stream a hook which is carried by a cable extended through the boom. When the object has been engaged by the hook the cable is reeled in either to retrieve the object or to tow it, as desired.

*Field of the invention*

This invention is well adapted for utilization with either rotary wing aircraft or fixed wing aircraft of a type suitable for towing or for retrieving objects on the ground or in the water.

*Description of the prior art*

Prior to this invention a cable from a winch in the aircraft passed through a bellmouthed aperture in a fitting carried by fixed structure of the aircraft and the hook simply bottomed on this fitting as the cable was fully reeled in. This arrangement required handling of the hook which was dangerous because of the unpredictable behavior of the aircraft and the weight of the hook which is usually about 75 pounds. Furthermore, the cable leading to the winch was under tension during towing which constituted another hazard.

*Summary of the invention*

A primary object of this invention is to provide completely automatic means for deploying and retrieving a tow hook which completely eliminates handling of the hook and which can be remotely controlled from the pilot's compartment if desired.

A further object of the invention is the provision of means to latch the tow hook to the tow boom so that, during towing, the towing tension is transmitted through the tow boom to fixed structure of the aircraft.

A yet further object of this invention is generally to improve towing installations for aircraft.

In accordance with the present invention, an extensible tow boom is secured at one end to the aircraft and carries at its trailing end a tow hook latching mechanism. A tow cable connected to a winch in the aircraft is routed through the tow boom and has at its trailing end a hook assembly that is automatically engaged by the latching mechanism when the cable is fully reeled in.

In accordance with further aspects of the invention, the hook assembly can be controlled while latched to the tow boom to occupy either a stowed position in which the telescopic boom is retracted and raised into a cradle, or a tow position in which the boom is retracted and is free to align laterally and vertically with the tow load. Means is also provided by which the hook assembly can be moved to a hook-lowering position, while still remaining latched to the tow boom, from which position the latching mechanism can be released to lower the hook and engage the tow cable of the object to be towed. By winching in the tow cable, the hook assembly can be retrieved into its latched position in which it is again connected to the boom in tow position. Finally, the boom can be raised into its stowed position in the aircraft.

*Brief description of the drawings*

FIG. 1 is a side elevation of a helicopter equipped with the tow boom installation of this invention;

FIG. 2 is a side elevation of the tow boom installation on an enlarged scale showing the boom and hook assembly in their stored position and, in dotted lines, in their extended position;

FIG. 3 is a side elevation of the tow boom and hook assembly in three different angular positions which it may occupy in use, the ramp being shown in its two open positions;

FIG. 4 is an enlarged side view of the tow boom and hook assembly, part of the boom being broken away to facilitate illustration;

FIG. 5 is a bottom view of the outboard end of the tow boom showing the latching mechanism for the hook assembly;

FIG. 6 is a section on line 6—6 of FIG. 4;

FIG. 7 is a section taken on line 7—7 of FIG. 4;

FIG. 7A is a section taken on line 7A—7A of FIG. 4; and

FIG. 8 is a view of th cable guiding structure taken on line 8—8 of FIG. 3.

*Description of the preferred embodiment*

Referring first to FIG. 1, a helicopter generally indicated at 10 has a fuselage 12 above which is mounted a single lifting rotor 14. The fuselage has a tail cone 16 at the extremity of which is mounted an anti-torque rotor 18. A pilot compartment, or cockpit, 20 is provided at the forward end of the fuselage behind which is provided a cargo, or crew, compartment 22.

At the aft end of the crew compartment at the base of the tail cone there is provided an opening through which a tow cable 24 can extend. This opening is provided by opening an upper door 26, shown in dotted lines. This door, which is hinged at its aft edge to the tail cone at 27, is shown open in FIG. 1 and remains open at all times when the tow boom of this invention is installed in the helicopter. The opening is further defined by a ramp 28 at the bottom of the opening. Ramp 28 is hinged at its forward edge to the fuselage at 30 and may occupy any of three positions as indicated by the full line and the two dotted line positions shown in FIG. 1. A hydraulic strut 32 (FIG. 2) is provided to actuate the ramp from its closed position shown in FIGS. 1 and 2 to either of its dotted positions shown in FIG. 1, its extreme open or tow position 34 and the other an intermediate open, or maintenance position 36. These two open positions 34 and 36 are shown clearly in FIG. 3. Ramp 28, in its movements, controls the positioning of a guiding mechanism (FIG. 8) for cable 24 which will be described in detail hereinafter.

The tow boom 38, which is of tubular construction, generally rectangular in cross section, is universally mounted on fuselage structure at its inboard end at vertical axis 41 and horizontal axis 40 and extends aft toward the rear opening provided by open door 26. The boom is made up of telescoping outer and inner sections 42 and 44, respectively (FIGS. 7 and 7A), the outer section 42 carrying latch means 46 (FIG. 4), herein shown controlled by a latch releasing handle 48. Latch means 46 releasably engages a pin 50 carried by the inboard end of the inner boom section 44. It will be understood that when it is desired to extend telescoping section 44, this latch can be released manually, or remotely by hydraulic or electrical means. A second spring-biased latch member 116 is carried by outer section 42 so as to engage stop 118 which is fixed to inner section 44 when the inner section is extended. When it is desired to retract inner section 44, latch 116 is disengaged by release cable 117.

Latch support 52 is carried by the outboard end of boom section 44 by means of upper and lower pins 54 and 56, respectively. Pin 56 is fixed in the boom and also supports a pulley 58 over which cable 24 is routed. Pin 54 is capable of being connected or disconnected from tow boom section 44 by means of a latch operating handle 60 (FIG. 4), which controls a latch 62. By releasing latch 62, latch support 52 can pivot about pin 56 from a position in which it is aligned with the tow boom, shown in FIG. 4, into a position in which it is depending therefrom as shown in dotted lines in FIG. 2.

Latch support 52 carries a pair of opposed latch members 64 pivoted on pins 66 (FIG. 6) which are constantly biased toward each other by compression springs 68 to engage the reduced throat portion 70 of an adapter 71 which forms a part of the hook assembly on the free end of cable 24. Latch members 64 are actuated to release the adapter by a handle 72 (FIG. 5) having its hub 74 pivoted on a bolt 76. Hub 74 has two links 78 pivoted to it which are connected by universal joints 80 to latch members 64. As handle 72 is moved about its pivot 76, in either direction, links 78 move latch members 64 away from adapter 71 to release the latter from support 52.

Adapter 71 has a tapered inboard end 82 which is guided by the cable into a flared aperture, or bellmouth 84 in support 52 which guides the adapter through the aligned passage 86 (FIG. 6) in latch support 52. Cable 24 is routed through passage 86, forward over pulley 58, through hollow tow boom sections 44 and 42 and over pulley 115 to the cable drum of a winch 88 (FIG. 1). A hook 90 is pivoted on adapter 71 by a pin 92 and is normally held in the position shown in which it is aligned with the cable. Means is provided, operative from the cockpit, for releasing the hook for movement about its pivotal support to jettison a load engaged by the hook. This releasing mechanism forms no part of this invention and is not shown herein.

As already noted, the ramp 28 can be moved by strut 32 from its closed position shown in FIG. 2 to a lower and generally horizontal position 36 or a still lower, fully open position 34. If the boom is in "stowed" position, the ramp would normally be closed. For the towing operation, the ramp is placed in its lower (dotted) FIG. 3 position. If it is desired that a crewman attend the hook when it is attached to the boom, the ramp would be placed in its generally horizontal position (full line in FIG. 3). It is noted that the purpose of the telescopic boom is to allow the hook to clear the ramp when deploying the hook, and also to allow usage of the ramp for the above-mentioned maintenance reasons without the necessity for providing walkway extensions onto the ramp.

Means is provided in all positions of the tow boom to confine and guide the cable 24 whenever the hook assembly is unlatched from support 52 and is lowered, or to constrain the cable 25 of the object being towed. To this end a cable guide frame is provided, generally indicated at 94 and shown most clearly in FIG. 8. This frame, which is rectangular, is pivoted at its lower end at 96 (FIG. 3) to the free end of ramp 28. Note that a roller 98 carried by brackets 99 on the ramp extends across the ramp between the side rails 100 of the frame 94 and that a second roller 102 of like lateral extent is carried by the frame. The two rollers, together with the side rails 100 define a rectangular area A within which the cable is confined. The position of the guide frame is changed from a generally horizontal position when the ramp is closed (FIG. 2) to an oblique position (FIG. 3) when the ramp is fully open in which it is normal to the tow boom in the lowermost tow position of the latter. This is accomplished by means of a trapezoidal frame 104, the shorter parallel side of which is pivoted to the bottom surface of the tail cone at 106 and the longer side of which is pivoted to guide frame 94 by pivots 108.

Normally, when the tow boom is not in use for towing, the boom is placed in the "stowed" position shown in full lines in FIG. 2 by means of hydraulic jack 120. In this, its uppermost position, the boom is wholly retracted with the hook assembly latched to the latch support 52. The boom may, in this position, be secured to an inverted U-shaped storage cradle 110 carried by the fuselage.

FIG. 7 shows two resilient rubbing guides 112 on the inner tow boom section 44 and FIG. 7A shows two like guides 114 on outer tow boom section 42. It will be understood that each section 42 and 44 has four such guides.

*Operation*

The operation of this system comprises three modes: (1) a lowering mode; (2) a raising mode; and (3) a towing mode. On commencing the lowering mode, adapter 71 is held by latches 64, thus securing the hook assembly to latch support 52 which is aligned with the tow boom 38 by latch 62. To lower the hook, latch 46 is released by operating handle 48. The lowering of the tow boom from its stowed position with the winch tension released allows the boom to fully extend until latch 116 engages stop 118 and locks it in place. Latch operating handle 60 is operated, either manually or remotely, releasing pin 54 and permitting latch support 52 and the hook assembly to pivot downwardly about pin 56 into a depending position. Rotation of handle 72 withdraws latches 64 and frees the hook assembly, including adapter 71 and hook 90, which drops through area A as cable 24 is payed out by winch 88. The hook may then trail through air or water until contact is made with the cable 25 of the object to be towed. At this point the system enters the raising mode.

To raise, cable 24 is reeled in and as adapter 71 passes latches 64 the latter are cammed open by tapered portion 82 (FIG. 4). When throat 70 of the adapter reaches latches 64, springs 68 will cause the latches to snap together and entrap the adapter and lock it to latch support 52. Continued reeling in of cable 24 bottoms hook 90 on bellmouth 84 and creates a moment about fixed pin 56 causing latch support 52 to rotate upwardly about pin 56 into a position in which pin 54 is engaged by latch 62. The retracting of the boom is then initiated by pulling release cable 117 of latch 116 so as to free stop 118. Reeling in of the cable 24 retracts the boom until pin 50 engages latch 46. Tension may then be relaxed on cable 24.

To tow, the hook is first lowered so as to become engaged with the tow cable 25 of the object to be towed and then raised, as above described. The tow boom is then lowered to its lowermost position by releasing the hydraulic jack 120. Since tension is now relaxed on cable 24, towing loads are carried by the boom. This is a decided safety factor since the crew of the helicopter is not endangered by the presence in the crew compartment of a cable under tension leading to the winch. It will be noted that during towing, adapter 71 can swivel in latch support 52 and that within the crew compartment cable 24 is free of towing tension. Since the tow boom is supported in the aircraft by a universal joint it can move freely laterally or vertically, upon deactivation of the hydraulic jack 120, so as to allow alignment with the towed cable 25 while in the confines of the roller guides. The jack can then be used as a damper. The helicopter flies forward when towing, assuming a slight nose down attitude. From the above it will be evident that a completely automatic operation of the tow hook is possible.

We claim:

1. A towing installation for aircraft including a tow boom having its inboard end supported in the aircraft, said boom having a latch supporting member at its outboard end, a latch carried by said member, a winch in said aircraft having a cable drum, a cable extended from said drum along said boom, and a hook assembly attached to the end of said cable, said assembly including an adapter having means engageable by said latch and a tow hook fixed to said adapter.

2. A towing installation for aircraft including a tow boom having its inboard end supported in the aircraft, said boom having a latch supporting member at its outboard end, a latch carried by said member, a winch in said aircraft having a cable drum, a cable extended from said drum along said boom, a hook assembly attached to the end of said cable, said assembly including an adapter having means engageable by said latch, said latch supporting member having means for connecting it to the outboard end of said boom by upper and lower pins, the lower pin being a fixed pin about which said member can pivot and the upper pin being engageable by a latch.

3. A towing installation for aircraft including a tow boom having its inboard end supported in the aircraft, said boom having a latch supporting member at its outboard end, a latch carried by said member, a winch in said aircraft having a cable drum, a cable extended from said drum along said boom, a hook assembly attached to the end of said cable, said assembly including an adapter having means engageable by said latch, said latch supporting member having means for connecting it to the outboard end of said boom including upper and lower pins, the lower pin being a pin fixed in said boom about which said member can pivot and the upper pin being fixed in said member, a latch carried by the outboard end of said boom for engaging said upper pin, and means for releasing said second mentioned latch including a latch releasing member carried by the outboard end of said boom.

4. A towing installation for aircraft including a tow boom having its inboard end supported in the aircraft, said boom having a latch supporting member at its outboard end, latch means carried by said member, a winch in said aircraft having a cable drum, a cable extended from said drum along said boom, and means for relieving said cable from tension loads during towing including hook means attached to the free end of said cable and engageable by said latch means when said cable is retracted to bring said hook means into engagement with said latch supporting members.

5. A towing installation for aircraft including a tow boom having its inboard end supported in the aircraft, said boom having a latch supporting member at its outboard end, latch means carried by said member, a winch in said aircraft having a cable drum, a cable extended from said drum along said boom, hook means attached to the free end of said cable and engageable by said latch means, means for connecting said latch supporting member to said boom including a lower pin carried by said boom and an upper pin carried by said member, and a latch carried by said boom in position to engage said upper pin when said cable is tensioned to pivot said latch supporting member about said lower pin from a pendant position into a position in which it is aligned with said boom.

6. A towing installation for aircraft including a tow boom having its inboard end supported in the aircraft, said boom having a latch supporting member at its outboard end, latch means carried by said member, a winch in said aircraft having a cable drum, a cable extended from said drum along said boom, hook means attached to the free end of said cable and engageable by said latch means, means for connecting said latch supporting member to said boom including a lower pin carried by said boom and an upper pin carried by said member, a latch carried by said boom in position to engage said upper pin when said cable is tensioned to pivot said latch supporting member about said lower pin from a pendant position into a position in which it is aligned with said boom, and a pulley mounted on said lower pin over which said cable is routed.

7. A towing installation for aircraft including a tow boom having its inboard end supported in the aircraft, said boom having a latch supporting member at its outboard end, a latch carried by said member, a winch in said aircraft having a cable drum, a cable extended from said drum along said boom, a hook assembly attached to the free end of said cable including an adapter and a tow hook fixed to said adapter, and means for transmitting towing loads through said boom to fixed aircraft structure during a towing operation including latch engaging means on said adapter engageable by said latch when said cable is retracted to bring said hook into towing position in which said hook assembly is in engagement with said latch supporting member.

References Cited

UNITED STATES PATENTS 2,734,697   2/1956   Brow _____ 244—3
2,953,442   9/1960   Hopper et al. _____ 244—3 X MILTON BUCHLER, *Primary Examiner.*

JEFFREY L. FORMAN, *Assistant Examiner.*

U.S. Cl. X.R.
280—491